UNITED STATES PATENT OFFICE.

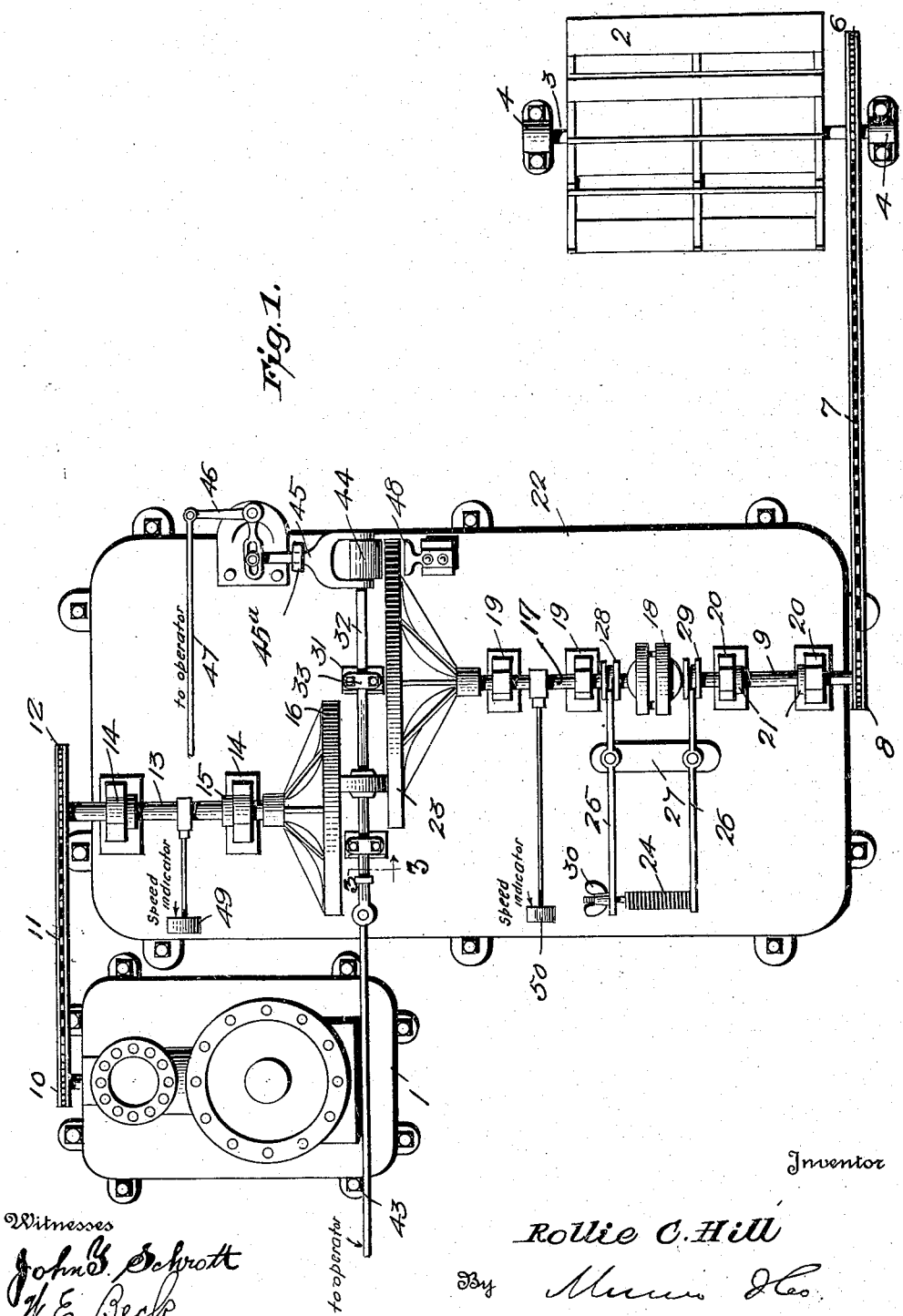

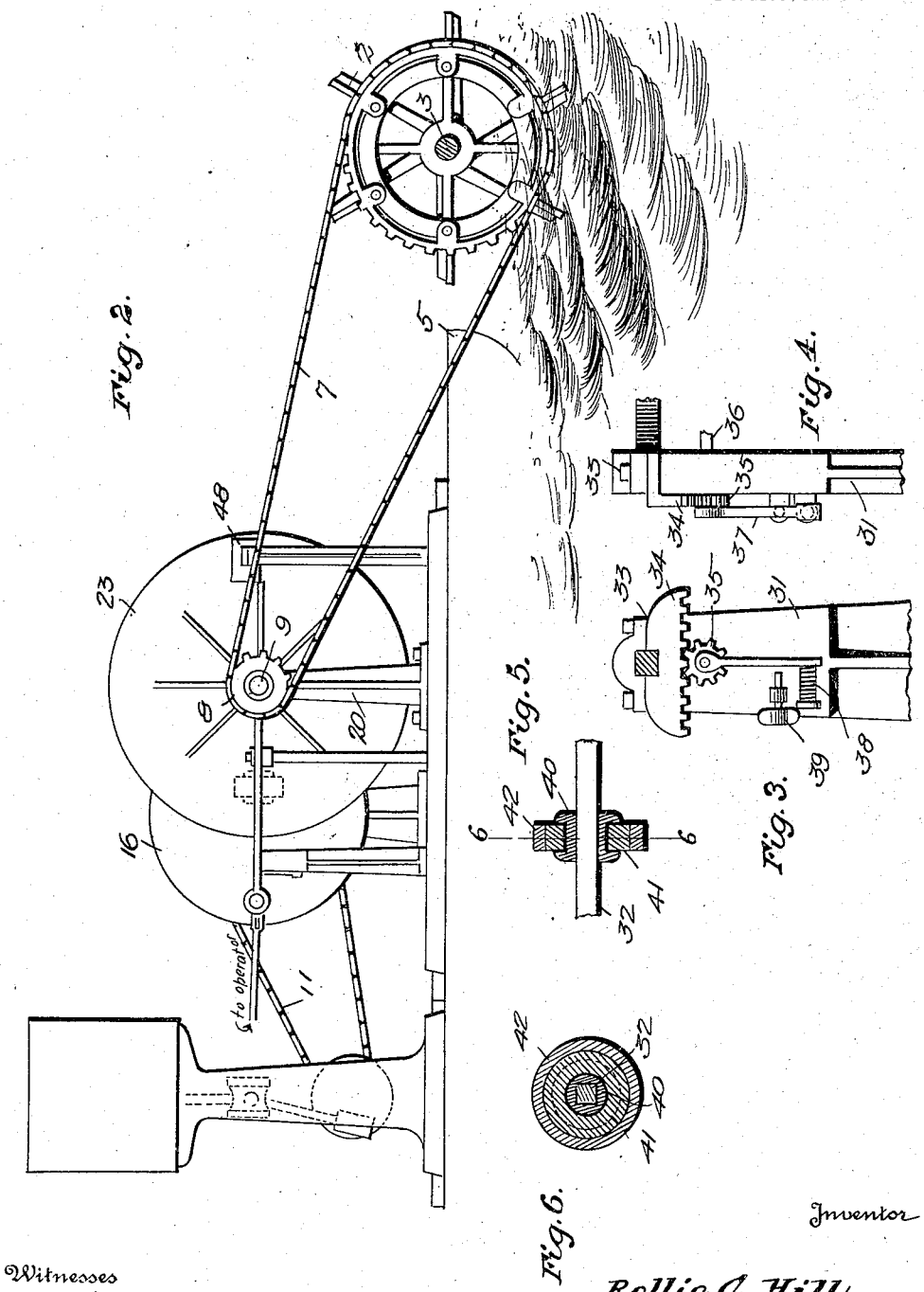

ROLLIE CALVIN HILL, OF MEMPHIS, TENNESSEE.

TRANSMISSION MECHANISM.

1,228,208.  Specification of Letters Patent.  Patented May 29, 1917.

Application filed August 12, 1916.  Serial No. 114,602.

*To all whom it may concern:*

Be it known that I, ROLLIE C. HILL, a citizen of the United States, and a resident of Memphis, in the county of Shelby and State of Tennessee, have invented new and useful Improvements in Transmission Mechanism, of which the following is a specification.

My invention is an improvement in transmission mechanism, and has for its object to provide mechanism of the character specified especially adapted for use in marine work, and for vessels operating in shallow water, wherein a greater propelling area may be safely and efficiently operated with a minimum of power and without loss of power.

In the drawings:

Figure 1 is a top plan view of the improved transmission in use,

Fig. 2 is a side view,

Fig. 3 is a section on the line 3—3 of Fig. 1, looking in the direction of the arrow adjacent to the line, Fig. 4 is a side view of Fig. 3, Fig. 5 is a section through the friction wheel, and Fig. 6 is a section on the line 6—6 of Fig. 5.

In the present embodiment of the invention, the transmission is arranged between the motor 1 and the paddle wheel 2, which is secured to the usual shaft 3 journaled in bearings 4 at the rear of the vessel 5 in the present instance, and this shaft 3 has a sprocket wheel 6 which is connected by a chain 7 with the sprocket wheel 8 on a driving shaft 9 of the transmission.

The shaft of the motor has a sprocket wheel 10 which is connected by a chain 11 with a wheel 12 on the first or primary transmission shaft 13. This shaft 13 is journaled in bearing standards 14 and stop collars 15 are provided for receiving end thrust to prevent longitudinal movement of the shaft in these bearings. A friction disk 16 is secured to the inner end of the shaft, and the shaft 13 is arranged parallel but in offset relation with respect to the second transmission shaft 17 which is arranged in alinement with the driving shaft 9. These shafts 9 and 17 are connected by a loose coupling 18, in such manner that they must rotate together, but may be moved with respect to each other longitudinally, and the shaft 17 is journaled in bearing standards 19 and is longitudinally movable in the said standards.

The shaft 9 is journaled in bearings 20, and stop collars 21 are provided for resisting end thrust. The shafts 9, 13 and 17 are arranged on a suitable base 22 which may be secured to the boat in the usual manner, and a friction disk 23 is secured to the inner end of the shaft 17, the said disk being parallel with the disk 16, but spaced away therefrom as shown. The shaft 17 is normally pressed away from the shaft 9 and toward the shaft 13 by means of a spring 24. This spring is arranged between the outer ends of a pair of levers 25 and 26, which are pivoted intermediate their ends to a support 27, and the inner ends of the levers engage annular grooved members 28 and 29 on the shafts 17 and 9 respectively. The tension of the spring 24 may be regulated by means of a winged nut 30, and the spring acts normally to force the shaft 17 toward the shaft 13.

A pair of standards 31 is arranged between the disks 16 and 23, and a shaft 32 is supported by these standards. The shaft 32 is mounted in sectional bearings 33 on the standards, and these bearings are slidable on the tops of the standards. Each bearing has a depending flange 34 provided with rack teeth, which engage the teeth of a pinion 35 secured to the shaft 36 journaled in the standard, and the shaft is provided with a depending arm 37 which is normally pressed in a direction to move the sectional bearings 33 and the shaft 32 away from the disk 16, by means of a spring 38. A stop 39 is provided for limiting the movement of the arm toward the spring.

The shaft 32 which is squared as shown in Figs. 5 and 6, has secured thereto a bushing 40, and this bushing is annularly grooved to receive a wheel 41 which is rotatable on the bushing and is provided with a band 42 of material having a high coefficient of friction. The shaft 32 is movable longitudinally by means of a link 43, to which suitable operating mechanism may be connected, and under normal conditions the periphery of the disk 41 will engage the friction disks 16 and 23, connecting the said disks and constraining them to rotate together. The shaft 17 may, however, be forced away from the shaft 13 to disconnect the disks, and the means for forcing the shaft 17 against the resistance of the spring 24 is a roller 44, which is journaled in the arms of a forked slide 45 having guided movement as indicated at 45ª on the base and operated by an elbow lever 46, one of the arms of the lever having a lost motion connection with the slide, while the other is connected by a link 47 with suitable operating mechanism, not shown, under the control of the operator.

When the elbow lever 46 is swung in one direction, the roller will be pressed against the face of the disk, and the disk will be moved, together with the shaft 17, away from the disk 16. A brake shoe 48 is arranged adjacent to the disk 23 on the opposite face from the roller 44, and by means of the roller the disk may be pressed against the brake shoe to brake the movement of the coupled shafts 17 and 9. A speed indicator 49 is arranged adjacent to the shaft 13, and a similar indicator 50 is arranged adjacent to the shaft 17, and these speed indicators are operatively connected with the said shafts to indicate the speed of rotation of the said shafts.

The operation of the improvement is as follows: In starting, the friction connecting wheel 41—42, will occupy approximately the position shown in Fig. 1, wherein it is near the periphery of the disk 23 and near the center of the disk 16. When the engine is running now, the relative speed of the shafts 13 and 17 will be such that the shaft 13 may drive the shaft 17 at a low speed, and with high power. That is, the connecting disk 41—42 is rotated slowly by the disk 16 and rotates the disk 23 yet more slowly, reducing the relative speed of the shaft 17 and increasing the power. As the boat moves and picks up speed, the connecting disk is moved toward the roller 44, until it is near the periphery of the disk 16 and near the center of the disk 23.

Conditions are now reversed, the relative speed of the shaft 17 being high and the power low. Whenever the disk 23 is moved away from the disk 16 by the roller 44, the connecting wheel 41—42 and the shaft 32, will also be moved away from the disk 16 under the influence of the springs 38. When it is desired to reduce speed, the roller 44 is forced against the disk 23, moving the shaft 17 away from the disk 16, and since the wheel 41—42 is immediately disconnected from the disk 16 by the springs 38, the connecting wheel may be set at any desired point with respect to the two disks.

To brake the action of the driving shaft, it is only necessary to force disk 23 against the brake shoe 48. Any excessive strains will be compensated for by slippage, since the transmission is frictional. It will be understood that the paddle wheel shown, is shown merely for convenience, and that any preferred form of propeller may be used.

I claim:

1. Transmission mechanism comprising driving and driven shafts journaled parallel and in offset relation, friction disks on the adjacent ends of the shafts, a connecting friction wheel between the disks, means for supporting and moving the wheel between the shafts, a transmission shaft in alinement with the driven shaft, a connection between the adjacent ends of the transmission shaft and the driven shaft for constraining them to rotate together and for permitting them to move longitudinally with respect to each other, each of the said last named shafts having a grooved collar adjacent to the connected end, levers pivoted intermediate their ends adjacent to the shafts and engaging the grooves of the collars at their inner ends, a spring connection between the outer ends of the levers and normally acting to draw them together, and means for varying the tension of the spring.

2. Transmission mechanism comprising driving and driven shafts journaled parallel and in offset relation, friction disks on the adjacent ends of the shafts, a connecting friction wheel between the disks, means for supporting and moving the wheel between the shafts, a transmission shaft mounted in alinement with the driven shaft, a connection between the said transmission and driven shafts for constraining them to rotate together and for permitting them to move longitudinally with respect to each other, a spring arranged in spaced relation and lateral with respect to the transmission and driven shafts and connected therewith for normally forcing them apart, and means for varying the tension of the spring.

ROLLIE CALVIN HILL.

Witnesses:
GEORGE GREEN,
EMMA ROBERTS.

Copies of this patent may be obtained for five cents each, by addressing the "Commissioner of Patents, Washington, D. C."